W. E. PUGSLEY.
AUTOMOBILE TOP.
APPLICATION FILED OCT. 7, 1913.
1,100,911.
Patented June 23, 1914.
3 SHEETS—SHEET 1.
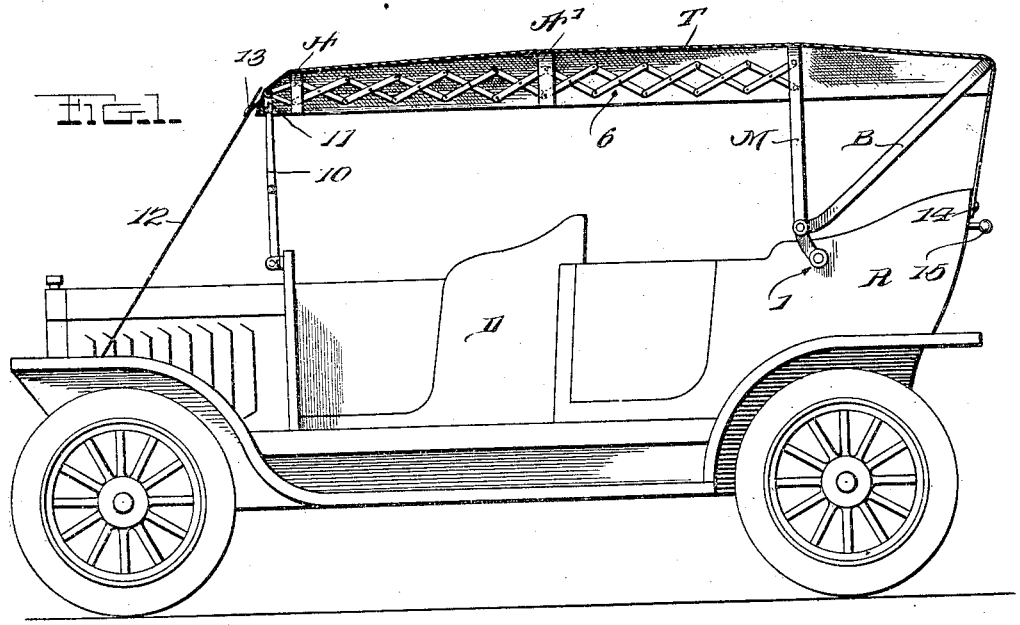
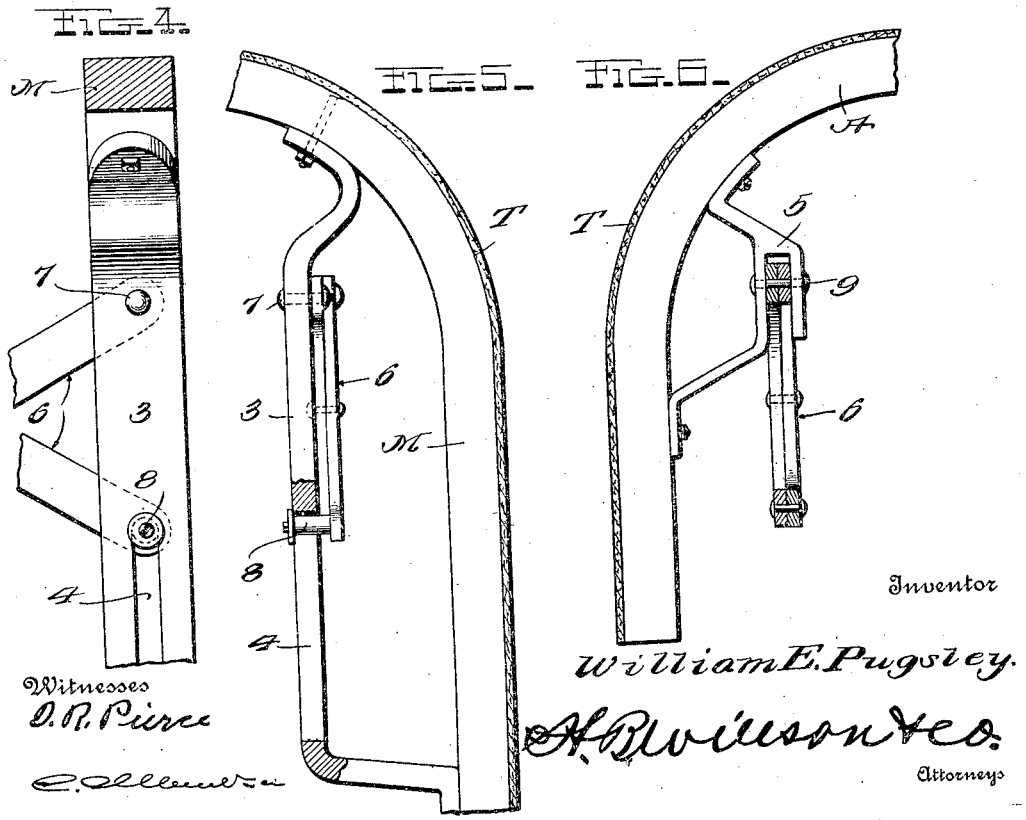
Witnesses
Inventor
William E. Pugsley.
Attorneys

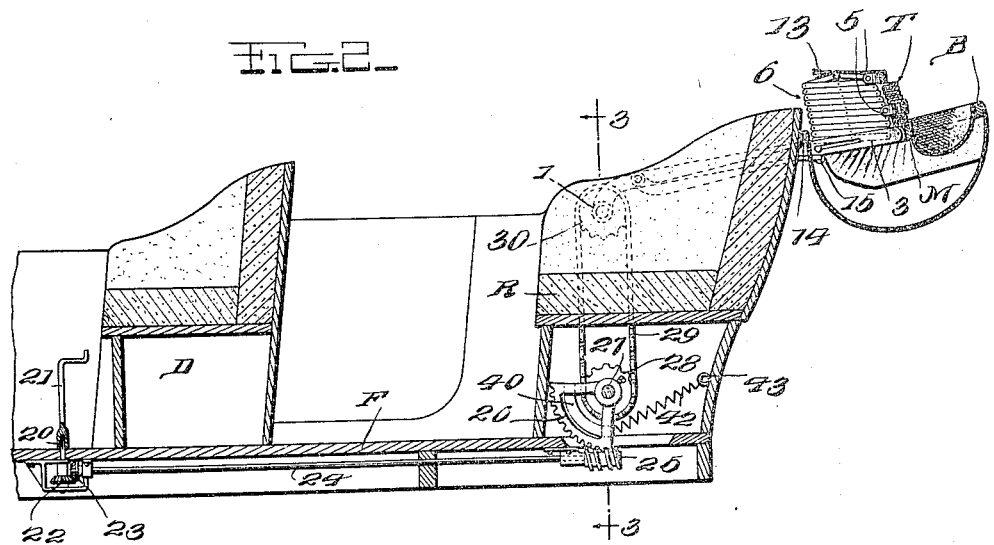

W. E. PUGSLEY.
AUTOMOBILE TOP.
APPLICATION FILED OCT. 7, 1913.
1,100,911.
Patented June 23, 1914.
3 SHEETS—SHEET 3.
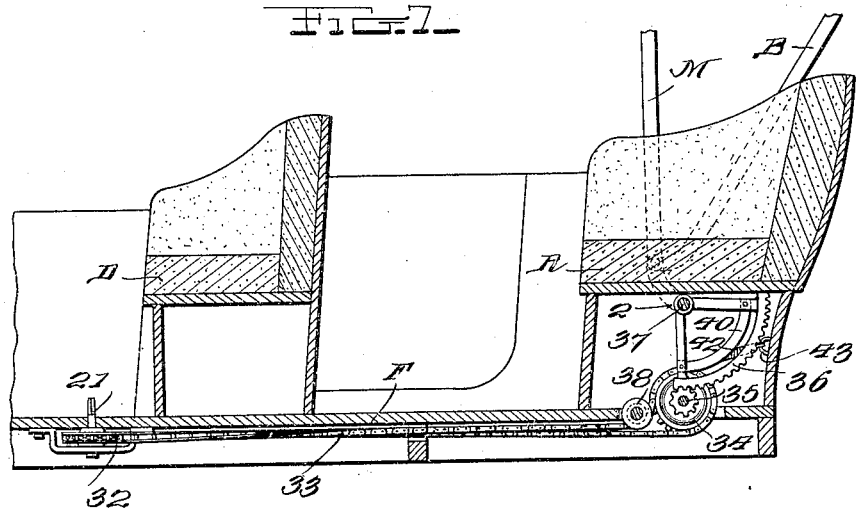
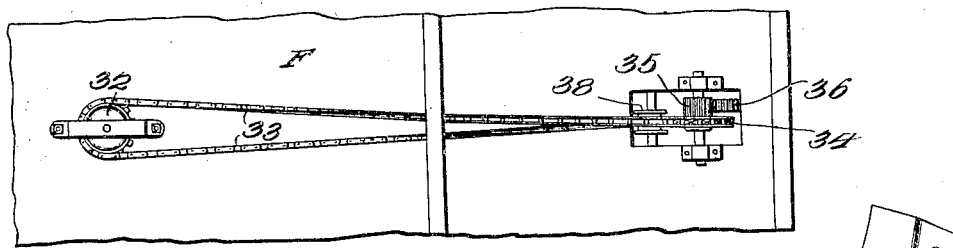
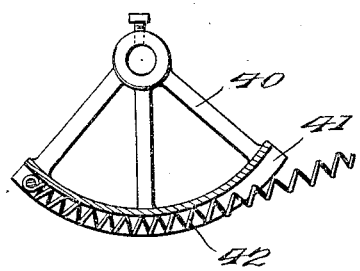
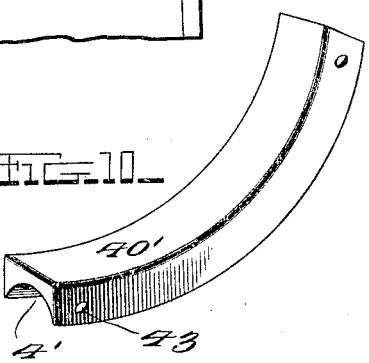
Inventor
William E. Pugsley.

UNITED STATES PATENT OFFICE.

WILLIAM EDWARD PUGSLEY, OF GRAND RAPIDS, MICHIGAN, ASSIGNOR OF ONE-HALF TO LEON SHEAR CARREL, OF GRAND RAPIDS, MICHIGAN.

AUTOMOBILE-TOP.

1,100,911.  Specification of Letters Patent.  Patented June 23, 1914.

Application filed October 7, 1913. Serial No. 793,874.

*To all whom it may concern:*

Be it known that I, WILLIAM EDWARD PUGSLEY, a citizen of the United States, residing at Grand Rapids, in the county of Kent and State of Michigan, have invented certain new and useful Improvements in Automobile-Tops; and I do declare the following to be a full, clear, and exact description of the invention, such as will enable others skilled in the art to which it appertains to make and use the same.

This invention relates to tops for vehicles, and more especially to those intended for use upon automobiles; and the object of the same is to provide improved means for raising such a top from a point adjacent the driver's seat.

This and other objects are carried out by constructing the device in the manner hereinafter more fully described and claimed, and as shown in the drawings wherein—

Figure 1 is a side elevation of an automobile equipped with this improved top and elevating mechanism, the near side of the top being broken away. Fig. 2 is a central longitudinal sectional view through the automobile and its top, showing one means for elevating the latter, and Fig. 3 is a cross section on the line 3—3 of Fig. 2. Fig. 4 is an inside elevation of one of the brackets attached to the main bow, and Fig. 5 an edge view of said bracket partly broken away. Fig. 6 is an edge view of the bracket applied to the front bow. Fig. 7 is a longitudinal sectional view through an automobile showing another means for connecting the top-elevating mechanism with the power shaft in front of the driver's seat; and Fig. 8 is a bottom plan view of the same. Figs. 9 and 10 are details as will be referred to hereinafter.

In the drawings the automobile illustrated is of the touring type having a driver's seat D and a rear seat R, and the top T is mounted on a main bow M which is braced as at B over the heads of the occupants of the rear seat, the top extending thence forward to a front bow or arch A as usual with tops of this kind. The material of the top itself and the construction of the bow, brace, and arch or arches are matters of no importance in the present case, as the object of the present invention is to raise the top from its folded condition as seen in Fig. 2 to its open condition as seen in Fig. 1 by mechanism which extends along beneath the floor line F of the automobile to a power shaft located within reach of the driver and preferably manipulated by a removable key.

Referring now to the details of the present invention, the main bow M is shown in Figs. 1 and 2 as pivoted at 1 rather high on the sides of the automobile body, and is shown in Fig. 7 as pivoted at 2 rather low. The bow by preference extends slightly forward from its supporting pivot and thence straight upward and across beneath the top T which is thereby distended at this portion of its length. At its front end the top is extended by a transverse bow or arch A, and possibly another such arch could be employed as indicated at A' in Fig. 1. Secured to the main bow within the top or cover proper is a bracket 3 best seen in Figs. 4 and 5, each bracket having an upright slot 4 at its lower end. Secured within the arch A or within the additional arches A' if they are employed, are brackets 5 as seen in Fig. 6. A lazy-tong structure 6 has the upper extremity of its rearmost link pivoted at 7 to the bracket 3 and the lower extremity of its crossing rear link provided with a stud 8 which slides in the slot 4 as indicated in Figs. 4 and 5. In order to support the arms of the arch or arches, the bracket 5 is pivotally connected at 9 to one of the upper pivots of the lazy-tone structure 6 as indicated in Fig. 6. The forward extremity of this structure may be detachably connected with a foldable standard 10 which rises from the dash of the machine, or the top T may have internal tabs 11 which removably engage knobs or buttons on this standard as indicated in Fig. 1. The standard itself may be braced, or preferably the top is drawn tightly forward, by means of a strap or straps 12 whose lower ends are connected with the front portion of the frame and whose upper ends are buckled as at 13 to the top or tabs projecting therefrom. The rear end of the top passes over the brace B (which is pivotally connected with the main bow in the usual manner) and is carried down to the point 14 where it is secured behind the rear seat R; and said seat at its sides carries rests or supports 15 on which the brace B and main bow M rest when the top is folded back to the rear as seen in Fig. 2. At this time the lazy-tong structure 6 will be folded as usual with structures of this character, and the intention is that its links or members shall be of such size that when distended as seen in Fig. 1 they will not stand too nearly in alinement to destroy the supporting and bracing qualities usually possessed by such structures. When the cover is put up as seen in Fig. 1, the strap or straps 12 will hold it distended against vibration and wind, and the standards 10 might be the end-bars of a wind shield as usually employed. When the cover is to be put down the straps are unbuckled at 13 and the top folded back to the main bow M and then this bow with the top is swung back to the position seen in Fig. 2 as usual. As the top will now have considerable weight, I find it desirable to provide means for raising it to an upright position so that it can be moved forward as the lazy tong structure permits, without the necessity for even the driver or the passengers leaving the machine, and possibly without the necessity for stopping the progress of the machine if there should be a passenger riding with the driver.

Referring now to Figs. 2 and 3, one means for raising the top consists of a squared power shaft 20 adapted to receive a removable key 21, the shaft extending down through the floor F just forward of the driver's seat D and carrying a beveled gear 22 which meshes with another beveled gear 23 on the front end of a shaft 24 which extends through suitable bearings beneath said floor to a point beneath the rear seat R and there carries a worm 25. Meshing with the latter is a toothed sector 26 which is illustrated in Fig. 3 as fast on a shaft 27 extending transversely of the frame beneath the rear seat R, although this shaft might be that constituting the pivotal point 2 of the main bow M if the latter were pivoted rather low as seen in Fig. 7. However, in this construction the pivotal points at the ends of the main bow are rather high, and hence the shaft 27 carries sprocket gears 28 connected by chains with other sprockets 30 on stub shafts 31 mounted in the sides of the car body, and to whose outer ends the main bow is connected as shown. When now the shaft 24 is turned through the driving mechanism manipulated by the key 21, its worm 25 turns the sector and the latter rocks the shaft 27, which being connected by the chains 29 with the stub shafts 31, causes the latter to turn in their bearings and the main bow to rise and to carry with it the top T in a manner which will be clear. As the key 21 can be applied and turned by the driver without leaving his seat, it follows that the top can be raised or lowered by him with great convenience.

Referring now to Figs. 7 and 8, the lower end of the power shaft 21 in this case carries a sprocket gear 32 connected by a sprocket chain 33 with another sprocket gear 34 fast on a counter shaft which is mounted in suitable bearings on the floor F of the machine, and this shaft carries a gear 35 meshing with a toothed sector 36 fast on a shaft 37 which extends across the car body beneath the rear seat R. In Fig. 7 this shaft is shown as carrying the main bow M at its extremities, because said bow is pivoted at a low point 2, but it is quite obvious that the exension chain 29 and sprockets and stub shafts above described could be employed if the pivots of the main bow were higher. In order to cause the chain to travel beneath the floor F an idler 38 is mounted in bearings just forward of the sprocket 34, and as the shaft of this idler and sprocket are horizontal while the power shaft 21 is vertical, the chain must be twisted as shown. With either construction it is quite possible to secure to the shaft 27 or 37 a sector 40 having a grooved periphery 41 to one end of which is attached a coiled spring 42, the other end of the spring being secured to some fixed point as indicated at 43 in Figs. 2 and 7; and the tension of this spring is exerted extending to turn the sector and the shaft to which it is connected in such direction as to raise the top T and therefore assist the operator when he raises it by means of the key—the spring being put under tension as the top is folded back.

In Fig. 10 is shown a shoe 40' having a curved and grooved periphery 4' and perforations 43 by means of which it may be connected with either toothed sector as by bolts or clips in a manner not necessary to illustrate. This shoe might take the place of the sector shown in Fig. 9, and the contractile spring 42 could then be connected with said sector if it were found that the top is too heavy to be manipulated by the driver. Therefore this detail permits the application of the spring without withdrawing the shaft 27 or 37 to slip onto it the eye of the sector 40. The key 21 is shown as having a crank handle, and it might in fact be the starting crank of the automobile if the automobile were of that type—otherwise it is preferably removable from the squared upper end of the power shaft 21 so that when removed it can lie on the floor F out of the way of the driver. Otherwise this attachment is entirely out of sight, and it may be applied to automobiles already constructed as well as it could be applied while they are being built. While I have shown the top T as supported along its sides by a lazy-tong structure 6, and as drawn taut by straps 12 at its front end and perhaps supported by standards 10, it is obvious that these details are not necessarily employed in connection with the top-raising mechanism because other means for distending and supporting the top forward of the main bow might be used without departing from the spirit of my invention.

What is claimed as new is:

1. In an automobile top, the combination with the main bow pivoted beside the rear seat and having inwardly extending brackets within its bends, each bracket having an upright slot, the top connected at its rear end to the rear seat and extending over said main bow, and other bows secured within said top forward of the main bow and each having additional inwardly extending brackets therein; of a lazy tong structure within the top along each side of the same having the rear upper end of one link pivoted to the bracket on the main bow and the rear lower end of its crossing link provided with a stud sliding in the slot therein, one of its upper pivots being pivotally connected with each bracket in said other bows, and means on the dash for supporting the forward end of said top.

2. The combination with an automobile, a top therefor, a main bow supporting the rear portion of the top and having its extremities pivoted to opposite sides of the rear seat, and means for supporting the front end of said top; of an upright power shaft journaled through the automobile floor in front of the driver's seat, a rock shaft journaled across the rear of the automobile body and connected with the pivotal points of said main bow, a toothed sector fast on said shaft, an idle shaft having a gear engaging said sector and a sprocket wheel, another sprocket wheel on the lower end of the power shaft, a chain connecting said sprocket wheels and leading beneath the floor, and an idler engaging said chain just forward of the rearmost sprocket wheel.

3. The combination with an automobile, a top therefor, a main bow supporting the rear portion of the top and having its extremities pivoted to opposite sides of the rear seat, and means for supporting the front end of said top; of an upright power shaft journaled through the automobile floor in front of the driver's seat, a rock shaft journaled across the rear of the automobile body, and connected with the pivotal points of said main bow, a toothed sector fast on said shaft, connections between said sector and power shaft, another sector connected with said shaft and having a grooved periphery, and a spring secured at one extremity in one end of said grooved periphery and secured at its other extremity to the automobile framework, for the purpose set forth.

4. The combination with an automobile body, a top therefor, a main bow supporting the rear portion of the top and having its extremities pivoted to the sides of the rear seat of the body, and means for supporting the forward end of said top; of a power shaft journaled in the floor forward of the driver's seat of said body, a rock shaft mounted in the body below the rear seat thereof and having connection with the pivotal points of the main bow of said top, a sector mounted on said rock shaft, connecting means between the sector and power shaft whereby to actuate said rock shaft upon actuation of the power shaft, and a coil spring having one end thereof engaged with said sector and the opposite end engaged with a portion of said body, said spring tending normally to dispose said sector in a position whereby to raise said main bow.

In testimony whereof I have hereunto set my hand in presence of two subscribing witnesses.

WILLIAM EDWARD PUGSLEY.

Witnesses:
   Cornelius De Boer,
   Joseph G. Pitsch.